(12) United States Patent
Umeda

(10) Patent No.: US 8,009,224 B2
(45) Date of Patent: Aug. 30, 2011

(54) IMAGE SIGNAL PROCESSING METHOD AND IMAGE SIGNAL PROCESSING DEVICE

(75) Inventor: Hidetoshi Umeda, Tokyo (JP)

(73) Assignee: Kyocera Corporation, Kyoto (JP)

( * ) Notice: Subject to any disclaimer, the term of this patent is extended or adjusted under 35 U.S.C. 154(b) by 468 days.

(21) Appl. No.: 12/158,958

(22) PCT Filed: Dec. 15, 2006

(86) PCT No.: PCT/JP2006/325029
§ 371 (c)(1),
(2), (4) Date: Jun. 23, 2008

(87) PCT Pub. No.: WO2007/074659
PCT Pub. Date: Jul. 5, 2007

(65) Prior Publication Data
US 2009/0316018 A1 Dec. 24, 2009

(30) Foreign Application Priority Data
Dec. 27, 2005 (JP) .................. 2005-375972

(51) Int. Cl.
G03B 7/00 (2006.01)
H04N 5/238 (2006.01)
H04N 5/228 (2006.01)
(52) U.S. Cl. .................. 348/362; 348/364; 348/222.1
(58) Field of Classification Search ............... 348/223.1, 348/362–366, 222.1, 229.1, 230.1
See application file for complete search history.

(56) References Cited

U.S. PATENT DOCUMENTS 5,929,908 A * 7/1999 Takahashi et al. ............ 348/364
6,101,294 A * 8/2000 McCaffrey et al. ........... 382/312
6,414,710 B1 * 7/2002 Takahashi et al. ............. 348/69
2004/0125993 A1* 7/2004 Zhao et al. .................... 382/124

FOREIGN PATENT DOCUMENTS

| EP | 0725536 A2 | 8/1996 |
|---|---|---|
| JP | 06-141229 | 5/1994 |
| JP | 08-214211 | 8/1996 |
| JP | 10-248035 | 9/1998 |
| JP | 11-238129 | 8/1999 |
| JP | 2002-502577 | 1/2002 |

OTHER PUBLICATIONS

English translation of Chinese language office action for corresponding Chinese application 200680053276 lists the references above.
Japanese language office action and its English language translation for corresponding Japanese application 2005375972.

* cited by examiner

Primary Examiner — Sinh Tran
Assistant Examiner — Mark Monk
(74) Attorney, Agent, or Firm — DLA Piper LLP (US)

(57) ABSTRACT

It is possible to improve a response of a dynamic range expansion processing. The present image signal processing method includes a first step (ST2) of extracting distribution parameters from a distribution of pixel signal levels composing an image signal of one picture, a second step (ST4, ST5) of determining a target value (BP1, BP2, etc.) of a break point based on extracted distribution parameters for a break point at which an inclination of an image signal level changes with respect to a cumulative change of amount of incident light upon pixels of the imaging portion changes, and a third step (ST6, ST7) of controlling the imaging portion so as to obtain a target value and change an output saturation characteristic of the image signal.

7 Claims, 11 Drawing Sheets

FEW BRIGHT PORTIONS

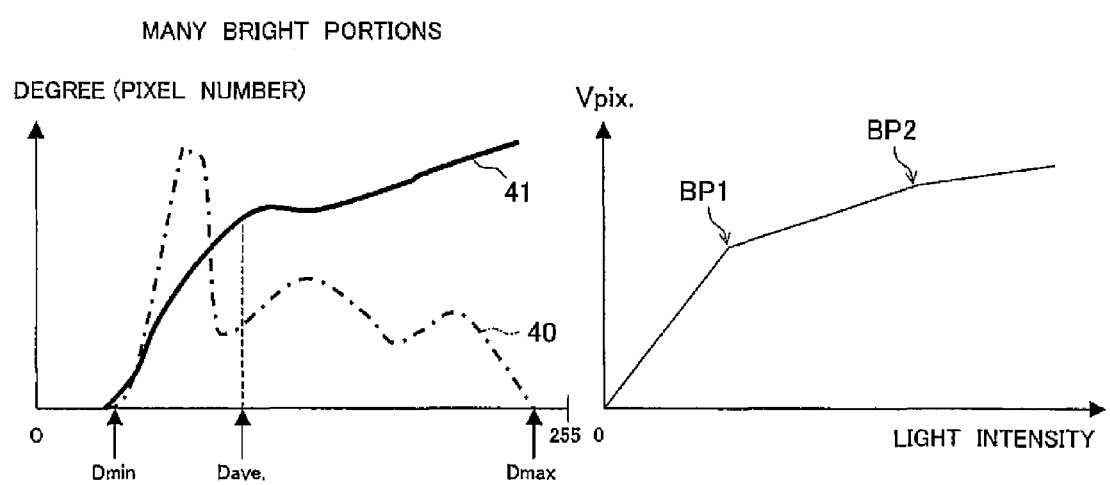
FIG. 10A
MANY BRIGHT PORTIONS
FIG. 10B
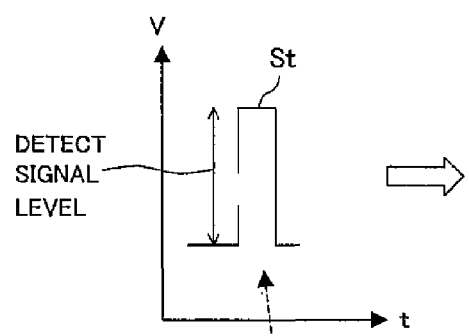
FIG. 11A
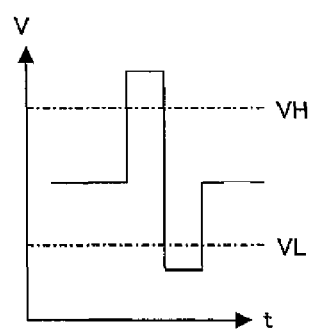
FIG. 11B
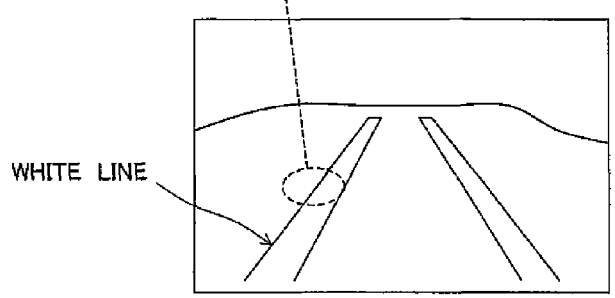
FIG. 11C

PRESENT INVENTION

IMAGE SIGNAL PROCESSING METHOD AND IMAGE SIGNAL PROCESSING DEVICE

CROSS-REFERENCE TO THE RELATED APPLICATIONS

This application is a national stage of international application No. PCT/JP2006/325029 filed Dec. 15, 2006, which also claims benefit of priority under 35 U.S.C. §119 to Japanese Patent Application No. 2005-375972 filed Dec. 27, 2005, the entire contents of which are incorporated herein by reference.

TECHNICAL FIELD

The present invention relates to an image signal processing method for enlarging a dynamic range of an image signal obtained from an imaging portion and a device for carrying out the method.

BACKGROUND ART

As an image sensor used for a camera device, a CCD sensor and a CMOS sensor are known. However, these solid state imaging devices have dynamic ranges of luminance narrower than a dynamic range of brightness of an actual object and therefore easily cause a drop in image quality such as so-called "over exposure" and "under exposure". Therefore, imaging control of the sensor and signal processing of the sensor output obtained as a result of the imaging sensor are used to expand the dynamic range of the imaging signal.

As these kind methods, a method is known of forming pixels in advance while classifying the pixels to ones having a high sensitivity and ones having a low sensitivity in accordance with the type of pixel filter etc., determining which signals of those pixels to mainly use in accordance with the luminance of the image by signal processing, and using these pixels to form a single image. Further, another method is known of capturing an image of one picture (one frame or one field) one time, but controlling a reset level of signal charges at the time of output of the signal charge, and expanding the dynamic range of the imaging signal so that the amount of overflow becomes different in accordance with the brightness of the picture (specifically, the amount of signal charges from each pixel) (see for example Patent Document 1). Further, a method is known of capturing images of a single picture a plurality of times at different imaging times and mixing these images to generate an image having a wide dynamic range by signal processing (see for example Patent Document 2).

Patent Document 1: Japanese Patent Publication (A) No. 10-248035
Patent Document 2: Japanese Patent Publication (A) No. 06-141229

DISCLOSURE OF THE INVENTION

Problem to be Solved by the Invention

The method described in the above Patent Document 2 is referred to as so-called "multiple exposure". In this method, however, it is necessary to perform a plurality of imaging operations within a time determined for the imaging and output of one picture in image signal standards (1 vertical (V) period). Further, the processing load for mixing images is large. It is also possible to perform the imaging, image mixing, and image output in different 1V periods. However, in that case, the response in the processing is lowered.

On the other hand, the method described in the above Patent Document 1, for example, in the case of a CMOS sensor, suitably changes an ON time (storage time control) of a transfer transistor provided in its pixel and a gate voltage level (reset level) of a reset transistor. Due to this, with a dark picture, it is possible to make the time (imaging time) until the reset level is reached longer, while with a bright picture, the reset level stepwise functions in accordance with the brightness and saturation is caused at a suitable level. In this method, the number of imaging operations for one picture is one and no image mixing is necessary, so this is preferable on this point.

However, there are applications such as for example vehicle-mounted camera devices where the camera devices detect a white line on the road surface during operation of the vehicle and use the detection results for safe driving.

In such applications, if shifting from an extremely dark imaging state in a tunnel to a bright imaging state outside the tunnel, the luminance distribution of the picture as a whole greatly changes. In addition, that change occurs in an extremely short time. In the camera device for such an application, if fixing each imaging time of the above multiple exposure and the above storage time, reset level, and other control parameters across the board, the white line will end up being buried in the noise level in one or both of the inside and outside of the tunnel, so correct detection will sometimes not be possible.

Therefore, for the above control parameters, the general practice has been control to raise or lower a control target from a certain fixed default value by a predetermined amount to find a suitable control target. Note that such control or control in place of this is not disclosed in the above Patent Documents 1 and 2.

FIG. 13(A) schematically shows this control method. An abscissa in FIG. 13(A) shows a number of times of control, while an ordinate shows an output, specifically, an indicator of the brightness of the entire picture.

In FIG. 13(A), an output S0 of a control operation 0 has a relatively low output level. For example, it shows the brightness inside a tunnel. When the situation changes from this state to a certain relatively bright state, for example, the outside of the tunnel, the control target range in that situation is indicated by a dotted line in FIG. 13(A). The control target range is not given as a parameter, but for example the target is made a level so that for example a white line can be reliably detected. Accordingly, the control target range differs for each situation after the change as well. It adaptively changes in accordance with the overall brightness.

In this case, the output S0 of the control operation 0 also varies according to the lighting etc. in the tunnel, therefore control is performed to expand the dynamic range by the default control amount in the first control operation. Assume that an output S1 of the control operation 1 obtained as a result of that exceeds the control target range. Whether or not it exceeds it is detected by the brightness information of the picture as a whole, for example, an integral value of the luminance.

In the next second control operation, the control amount is changed to somewhat prevent over exposure and the control for expanding the dynamic range is executed again. Assume that an output S2 of the control operation 2 obtained as a result falls slightly below the control target range.

Then, in the next third control operation, the control amount is changed to somewhat prevent under exposure and the control for expanding the dynamic range is executed again. In the present example, the output S3 of the control operation 3 obtained as a result first enters the control target range. The suitable exposure control ends by this.

However, with the method of successively determining the next control amount (control target) while viewing the results after such control, the response is insufficient for an application where the brightness of the imaging environment rapidly changes such as for example with mounting on a vehicle.

The aim the present invention is to provide an image signal processing method including a technique for determining a control target suitable for improving the response of the dynamic range enlargement processing and a device for this purpose.

Means for Solving the Problem

A first image signal processing method according to the present invention is an image signal processing method for expanding a dynamic range of an image signal obtained from an imaging portion, characterized by comprising a first step of extracting distribution parameters from a distribution of pixel signal levels composing the image signal of one picture, a second step of determining a target value of a break point at which an inclination of the change of image signal level with respect to a cumulative change of amount of light incident upon the pixels of the imaging portion changes on the basis of the extracted distribution parameters, and a third step of making an output saturation characteristic of the image signal change, by controlling the imaging portion so that the target value is obtained.

In the present invention, preferably, the distribution parameters include a minimum value of the pixel signal levels in the one picture, the target value includes a first target value indicating a maximum level of a first region having the minimum value as a starting point on the distribution, the first step extracts an average value of the pixel signal levels of the distribution, and the second step sets the first target value within a predetermined range about the average value.

A second image signal processing method according to the present invention is an image signal processing method for expanding a dynamic range of an image signal obtained from an imaging portion, characterized by comprising a first step of extracting distribution parameters including a minimum value from the distribution of pixel signal levels composing the image signal of one picture, a second step of determining a first target value indicating a maximum level of a first region having the minimum value as a starting point on the distribution based on the extracted distribution parameters, a third step of determining another target value using the already determined target value as a starting point, and a fourth step of compressing or extending the distribution of the first region within a range from the minimum value to the first target value and compressing or extending the distribution of another region within a range between corresponding target values.

A first image signal processing device according to the present invention is an image signal processing device for expanding a dynamic range of an image signal obtained from an imaging portion, characterized by having a parameter extraction portion for extracting distribution parameters from a distribution of pixel signal levels composing an image signal of one picture, a target setting portion for determining a target value of a break point based on the extracted distribution parameters for a break point at which an inclination of an image signal level change with respect to a cumulative change of amount of incident light upon pixels of the imaging portion changes, and a control part for controlling the imaging portion so that the target value is obtained and making an output saturation characteristic of the image signal change.

In the present invention, preferably, the distribution parameters include a minimum value of the pixel signal levels in the one picture, the target value includes a first target value indicating a maximum level of a first region having the minimum value as the starting point on the distribution, the parameter extraction portion extracts an average value of pixel signal levels of the distribution, and the target setting portion sets the first target value within a predetermined range about the average value.

A second image signal processing device according to the present invention is an image signal processing device for enlarging a dynamic range of an image signal obtained from an imaging portion, characterized by having a histogram generation portion for distributing histogram of a distribution of pixel signal levels composing an image signal of one picture on a memory, a parameter extraction portion for extracting distribution parameters including a minimum value from the histogram of the distribution, a target setting portion for determining a first target value indicating a maximum level of a first region having the minimum value as a starting point on the distribution based on the extracted distribution parameters and determining another target value using the already determined target value as a starting point, and a signal processing portion for compressing or extending the distribution of the first region within a range from the minimum value to the first target value and compressing or extending the distribution of another region within a range between corresponding target values.

Effect of the Invention

According to the present invention, there is the advantage that the response of the dynamic range expansion processing is high.

BRIEF DESCRIPTION OF THE DRAWINGS

FIG. 10 (A) is a histogram in a case where there are many bright portions on a picture in an embodiment of the present invention, and (B) is a broken line control graph.

FIGS. 11 (A) to (C) are graphs and diagrams showing an edge detection method useable in an embodiment of the present invention.

DESCRIPTION OF NOTATIONS

Figure 1:
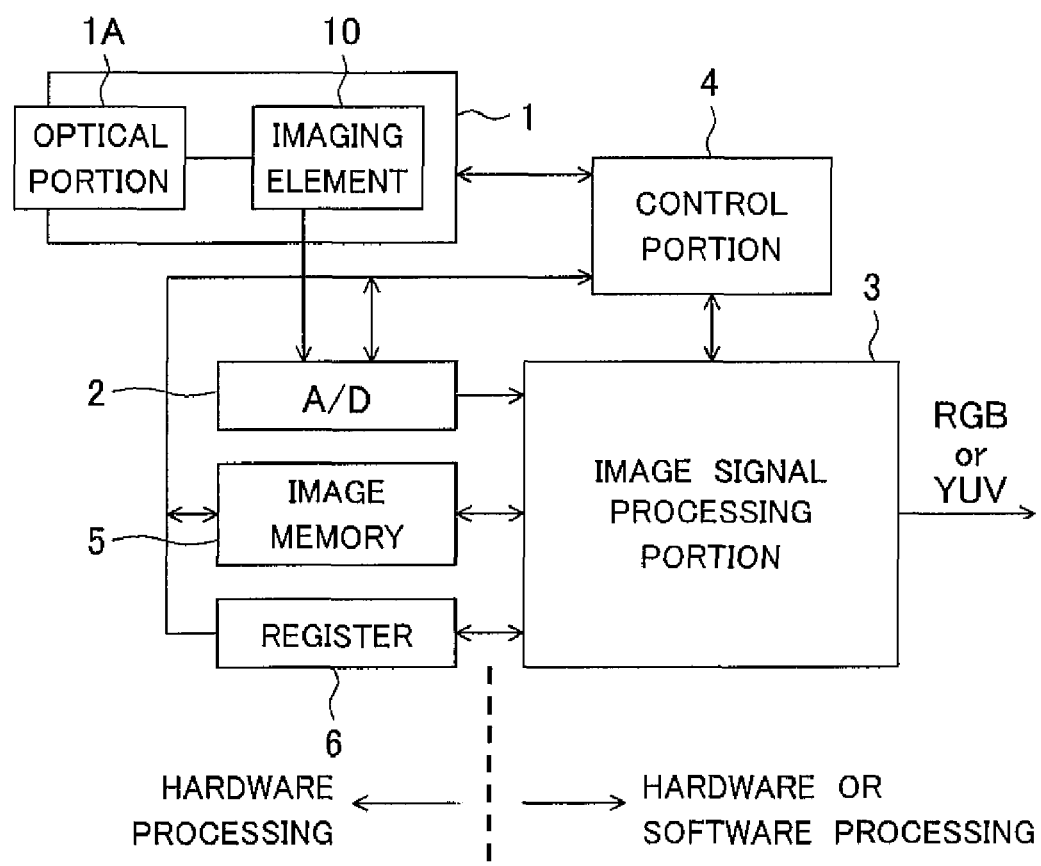
FIG. 1 A block diagram of a camera device according to an embodiment of the present invention.

2 A/D conversion portion
3 image signal processing portion
4 control part
5 image memory
6 register
10 imaging element
11 reset transistor
12 transfer transistor
11A, 12A potential barriers
13 amplifier transistor
14 vertical signal line
20 vertical drive circuit
21 pixel
22 horizontal drive circuit
34 histogram generating means
35 parameter extracting means
36 target setting means
37 signal processing means
32, 33, 38, 39 charge storage lines
40 histogram data
41 curve representing cumulative value of number of pixels
VT transfer voltage
VSC saturation control voltage
VAA power supply voltage
Vpix. image signal
V1 first saturation voltage
V2 second saturation voltage
V3 third saturation voltage
V4 fourth saturation voltage
Ae stored charge amount
BP1 to BP3 break points

BEST MODE FOR CARRYING OUT THE INVENTION

FIG. 1 shows the basic configuration of a camera device provided with (having) an image signal processing device (for example image signal processing IC) of the present embodiment.

The illustrated camera device has an imaging portion 1 provided with an imaging element 10 and an optical portion 1A, an A/D conversion portion 2 for converting a signal from the imaging element 10 to a digital signal, an image signal processing portion 3 for applying various processing to the digital signal after the A/D conversion, an image memory 5 for storing an image signal in units of for example 1 frame or 1 field for the image signal processing, a register 6 for holding various types of parameters required for the image signal processing, and a control part 4 for controlling other portions by control including timing control.

The image signal processing portion 3 executes, as various types of processing, for example processing of expanding the dynamic range of a captured (obtained) image other than general processing such as white balance adjustment, interpolation processing, and ν (gamma) processing. The image signal processing portion 3 outputs the image after the processing as for example an RGB and YUV image signal.

Among the portions described above, the imaging portion 1, A/D conversion portion 2, image memory 5, and register 6 are portions which can be realized from just hardware, while the image signal processing portion 3 and control part 4 are portions which can be partially or fully realized as functions of software. Among these, the function of generation of a clock or pulse for the timing control of the control part 4 is usually realized by hardware. Further, in the image signal processing portion 3 as well, any function required to have a real time processing performance is usually desirably realized by hardware. When the image signal processing portion 3 is configured by an ASIC (applied specific integrated circuit) including a DSP (digital signal processor), the processing can be executed at a higher speed than a CPU of a so-called microprocessor, so is desirable.

Note that the applications of the present camera device are not limited, but as an application requiring a dynamic range expansion processing having a particularly good response, there is mounting on a vehicle. The following description is predicated on a camera device to be mounted on a vehicle. Further, it is predicated on the image signal processing portion 3 being configured by the ASIC including the DSP.

The dynamic range expansion processing in the present embodiment has its characterizing feature in the signal processing after the imaging. The imaging element structure and imaging method basically may be any structure and method. However, it is necessary to obtain an output suitable for signal processing from the imaging element. Below, an example of the element structure and an example of the imaging method for obtaining an output (imaging signal) suitable for signal processing will be explained.

Figure 2:
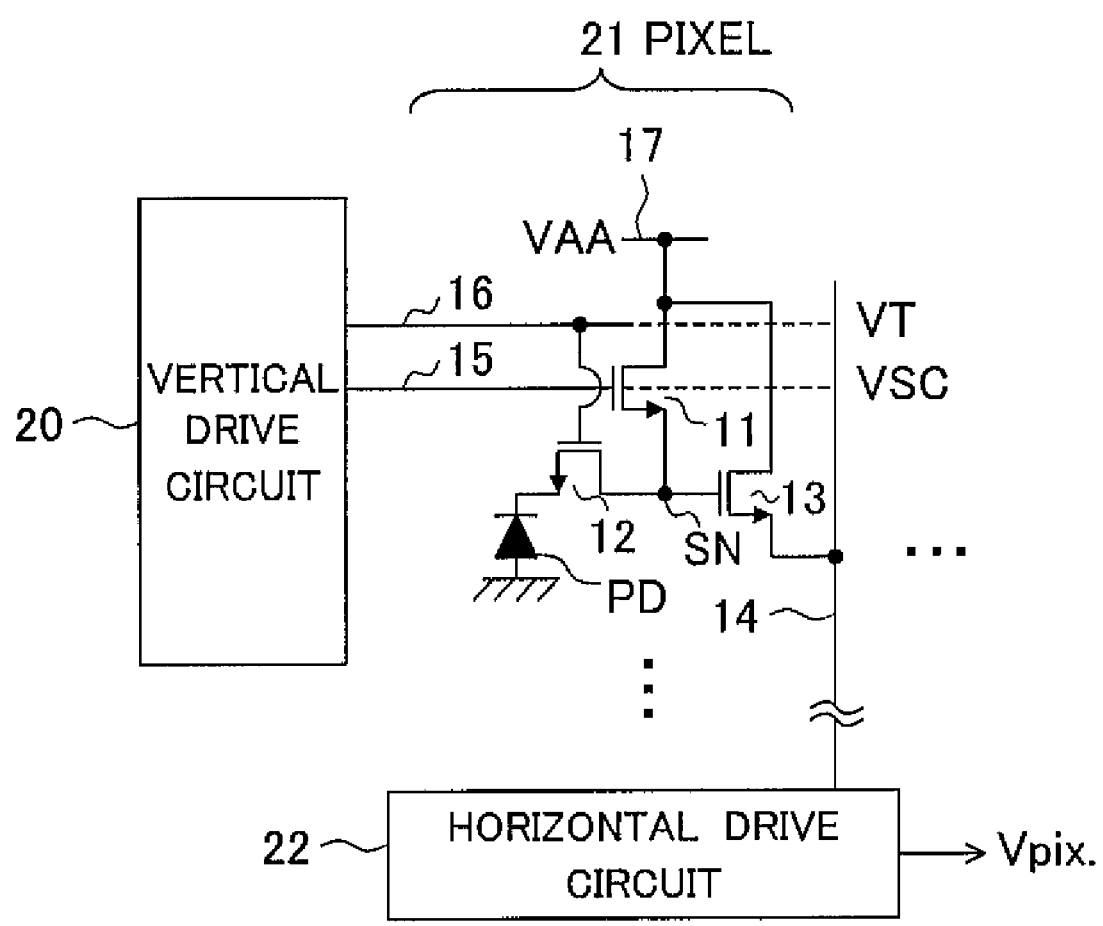
FIG. 2 A view of the configuration of an imaging element according to an embodiment of the present invention.

FIG. 2 illustrates the configuration of a portion of the imaging element 10.

The imaging element 10 of the present example is provided with an imaging portion configured by a so-called CMOS sensor and peripheral circuits thereof. The portion illustrated in FIG. 2 shows a circuit configuration of one pixel 21 composing the imaging portion and a connection with a vertical drive circuit 20 for controlling a read timing of the pixel 21.

Each pixel 21 has three transistors (here, NMOS) 11, 12, and 13 and a photodiode PD.

The above three transistors are configured by a reset transistor 11 for switching a storage node SN from a floating state to a connection state to a power supply line 17, charging a power supply voltage VAA to the storage node SN, and resetting a stored charge amount thereof, a transfer transistor 12 for transferring charges (usually, electrons) generated at the photodiode PD to the storage node SN again in a floating state again after reset, and an amplifier transistor 13 connected at its drain to the power supply line 17, amplifying a pixel signal in accordance with stored charge transferred to the storage node SN, and outputting the same to a vertical signal line 14.

The reset transistor 11 is connected at its drain to the power supply line 17, connected at its source to the storage node SN, and connected at its gate to a first control line 15 for controlling application of a saturation control voltage VSC and reset voltage VRT. Among these, the transfer transistor 12 is connected at its drain to the storage node SN, connected at its source to a semiconductor impurity doped region (not shown) forming a cathode of the photodiode PD, and connected at its gate to a second control line 16 for controlling an application time (imaging time) of the transfer voltage VT. The amplifier transistor 13 is connected at its drain to the power supply line 17, connected at its source to the vertical signal line 14, and connected at its gate to the storage node SN.

The imaging portion is configured by a few hundred to a few thousand such pixels 21 arranged in horizontal and vertical directions.

A vertical drive circuit 20 for supplying various voltages to these first and second control lines 15 and 16 is provided on the periphery of the pixel portion. Further, a horizontal drive circuit 22 for processing the pixel signal read out to the vertical signal line 14 for the purpose of for example noise elimination and clamping of the reference level, converting this read out signal to a time series signal, and reading the converted signal is provided on the periphery of the pixel portion. Further, a timing control circuit for controlling the vertical or horizontal drive circuit is provided inside the imaging element 10. The timing control circuit is controlled by the control part 4 of FIG. 1 and executes saturation control and imaging time control as will be explained later. The control part 4 controls the vertical drive circuit 20 etc. and reads signal from the pixel portion as well. When the imaging element 10 captures (obtains) an image of the object under these controls, the signal (imaging signal) from the horizontal drive circuit 22 is output to the outside via an output terminal of the imaging element 10.

Note that the configuration of the pixel 21 is not limited to FIG. 1. It may also be four-transistor type pixel provided with a select transistor in series with the amplifier transistor 13. Further, the supply of power of the amplifier transistor 13 and the supply of power of the reset transistor 11 may be carried out from different lines as well. Further, the supply of power of these transistors may be turned on or off by the vertical drive circuit 20. In short, the pixel 21 may be configured by at least the three transistors 11 to 13 and the photodiode PD connected as illustrated whereby output control of pixel signals to the storage node SN and vertical signal line 14 is performed.

The imaging signal output from the imaging element 10 is sent to the A/D conversion portion 2 of FIG. 1 where it is converted to a digital signal which is then subjected to predetermined signal processing by the image signal processing portion 3.

The imaging method may be any of a method using so-called multiple exposure capturing an image of the same object several times in a predetermined period and a method of stepwise changing the reset level at the time of exposure.

In the multiple exposure, the time for that imaging and saturation level are individually set for each imaging operation. Details of setting of these imaging time and saturation level will be explained later. In general, the sensor output is not saturated even by incidence of strong light (bright portion of an image) if the imaging time is made short, therefore so-called "over exposure" can be prevented or suppressed. On the other hand, if the imaging time is made long, the sensitivity of the sensor output can be made relatively large even with incidence of weak light (dark portion of the image), therefore so-called "under exposure" can be prevented or suppressed. Further, when the saturation level is made small, the sensor output is easily saturated. However, the relative magnitude of the signal level with respect to the saturation level can be enlarged. Conversely, when the saturation level is made high, the sensor output becomes hard to become saturated. However, the relative magnitude of the signal level with respect to the saturation level becomes small.

Accordingly, when optimizing the time of the imaging and saturation level for each imaging operation in accordance with the luminance level distribution of the object which is captured at present in a plurality of imaging operations and generating (mixing) one picture from the obtained plurality of imaging signals, it becomes possible to obtain an image of a high dynamic range in which a high luminance portion (bright portion) is not saturated and gradation expression is enriched and the gradation expression of a low luminance portion (dark portion) is enriched.

On the other hand, in the method of stepwise changing the reset level at the time of exposure, the number of imaging operations with respect to one picture is one. The imaging time is controlled according to the ON time of the transfer transistor 12, then the reset level (saturation level) is stepwise controlled by the reset transistor 11.

A vehicle-mounted camera device of the present example has its characterizing feature particularly in the method of dynamic range expansion processing. Below, an explanation will be given of the configuration and operation for the dynamic range expansion processing. Here, an explanation will be given for the latter case of stepwise controlling the reset level between the above two methods.

Figure 3:
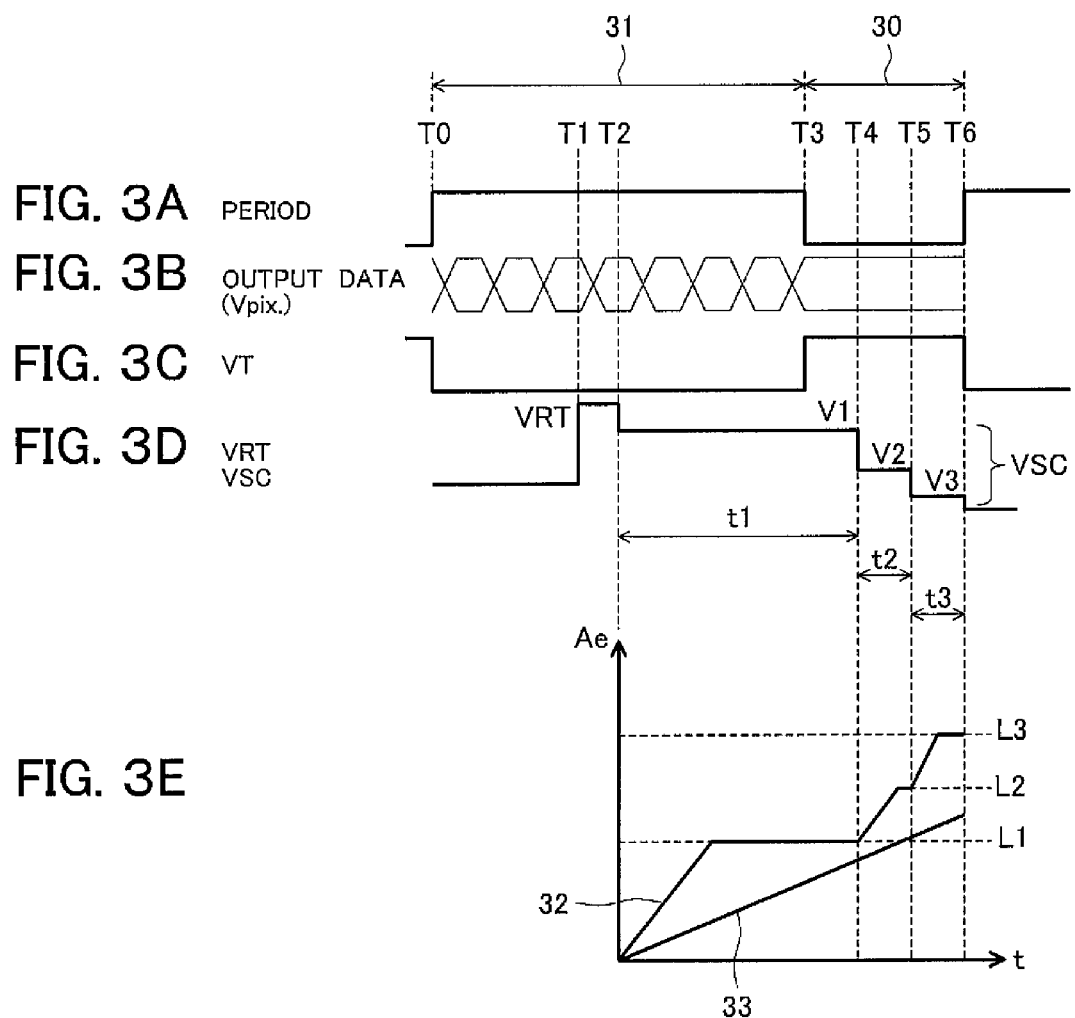
FIGS. 3 (A) to (D) are timing charts of periods and signals at the time of imaging according to an embodiment of the present invention. (E) is a graph showing a trend along with time of a saturation level according to an embodiment of the present invention.
Figure 4:
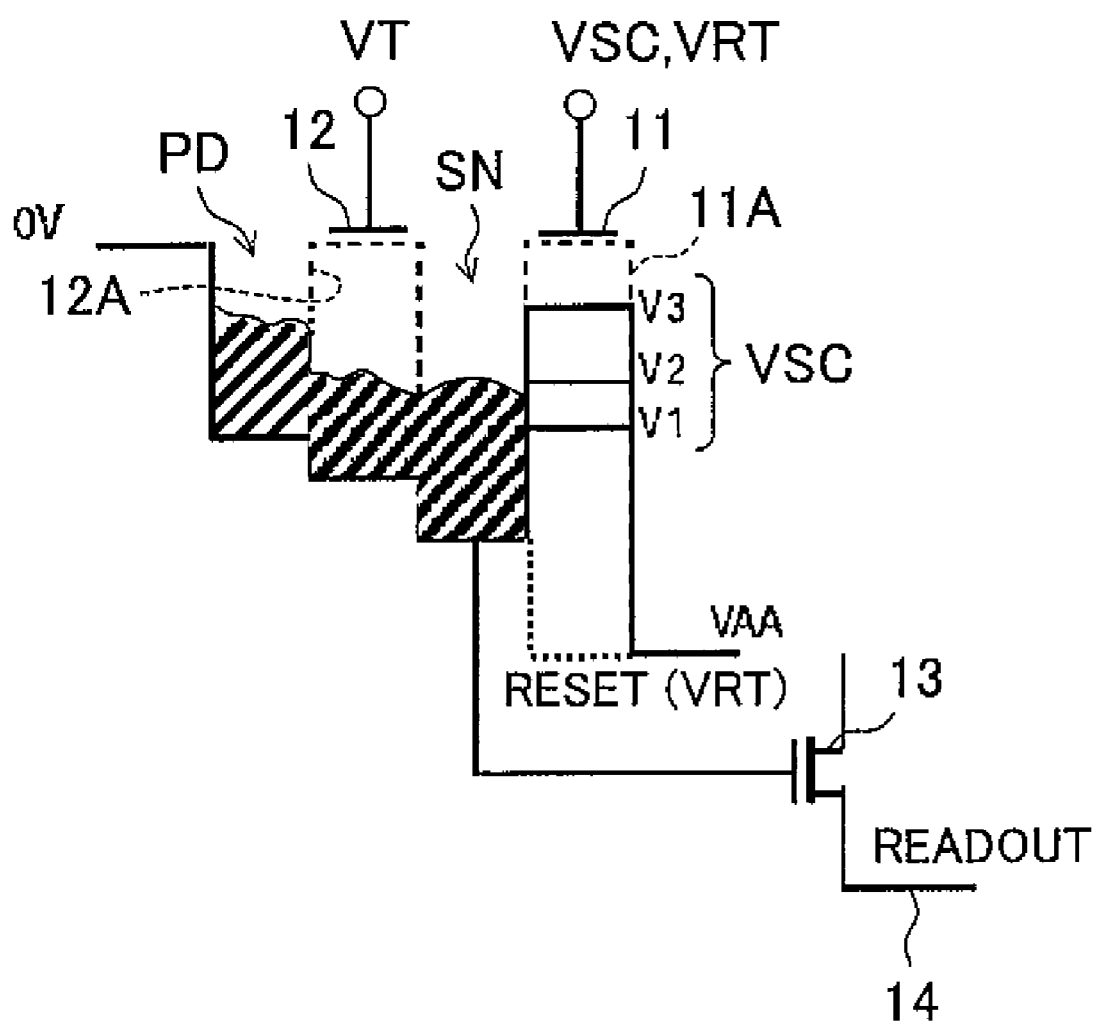
FIG. 4 A schematic view of voltage control at the time of reading a signal according to an embodiment of the present invention.

FIG. 3 is a timing chart of signals for explaining the method of stepwise controlling the reset level. Further, FIG. 4 schematically shows the voltage control when reading the imaging signal from a pixel 21 of FIG. 2.

In FIG. 3, one frame period is shown in (A), and a schematic waveform of output data is shown in (B) of the same diagram. Further, storage control of outputting charges from the photodiode PD to the storage node SN of the pixel is shown in (C) of the same diagram, and saturation control using the reset level (saturation level) at the time of the storage control is shown in (D) by the level and application timing of the voltage. Further, a trend along with time of the saturation level when charges are stored in the storage node SN is shown in (E) of the same diagram as a schematic graph. The abscissa of this graph indicates the time t, and the ordinate indicates the stored charge amount Ae.

In this illustrated example, as shown in FIG. 3(A) and FIG. 3(B), in the image signal standard for a vertical (V) blanking period 30, the output data is output to the outside of the imaging portion 1 by using all of a period 31 corresponding to a scanning period of one picture. For this reason, as shown in FIG. 3(C) to FIG. 3(E), the output of the storage node SN of stored charges and the saturation level control there are executed by mainly utilizing the V blanking period 30.

Below, the operation will be explained in sequence with reference to FIG. 3 and FIG. 4. FIG. 4 is an explanatory diagram for explaining gate voltage control of the transfer transistor 12 and storage of charges, transfer, and saturation according to the gate voltage control of the reset transistor 11.

At the time T0 when the period 31 of FIG. 3 is started, the transfer voltage VT shifts from a high level to a low level, and the transfer transistor 12 of FIG. 2 becomes off. At this time, a previous image signal Vpix. output to the vertical signal line 14 of FIG. 2 is confirmed by the horizontal drive circuit 22 of FIG. 2, converted to a time series signal, and then started to be output to the outside of the imaging element 10 as shown in FIG. 3(B).

Next, as shown in FIG. 3(D), the reset voltage VRT is supplied to the gate of the reset transistor 11 at the time T1. Due to this, the power supply voltage VAA is supplied to the storage node SN, therefore the stored charges of the storage node SN are output to the supply line of the power supply voltage VAA. At the next time T2, the application of the reset voltage VRT is suspended, whereupon the next imaging operation is started. When the imaging operation is started, charges (electrons in the present example) in accordance with the incident light amount are stored in an N type impurity doped region (not shown) serving as the cathode of the photodiode PD. At this time, the transfer voltage VT supplied to the gate of the transfer transistor 12 is at the low level (FIG. 3(C)), and a potential barrier 12A is formed as shown in FIG. 4.

FIG. 3(E) shows a situation of storage of electrons. Here, notation 32 indicates a charge storage line of the case where the incident light is strong, while notation 33 indicates a charge storage line of the case where the incident light is weak.

In the charge storage line 32 of the case where the incident light is strong, the stored amount of electrons substantially linearly increases up to the first saturation level of the photodiode PD, but after that point of time, the stored charge amount is clipped at the first saturation level L1. On the other hand, in the charge storage line 33 of the case where the incident light is weak, the charge amount continues to increase substantially linearly.

The saturation level of the photodiode PD can be (electrically) controlled according to the height of a potential barrier of the photodiode where there is an OFD (Over Flow Drain). Note that, in the present example, for convenience of explanation, it is assumed that the saturation level of the photodiode PD is equivalent to the saturation level L1 by the voltage v1 explained later.

As shown in FIG. 3(C), the transfer voltage VT is shifted from the low level to the high level so as to turn on the transfer transistor 12 of FIG. 2 at an end point of time (time T3) of the period 31. Further, as shown in FIG. 3(D), the saturation control voltage VSC is controlled to the first saturation voltage V1 lower than the reset voltage VRT at almost the same time.

At this time, as shown in FIG. 4, the potential barrier 12A is lowered by the above voltage control, and stored electrons are transferred from the photodiode PD to the storage node SN. Electrons transferred to the storage node SN can be stored in the storage node SN up to the height of the potential barrier 11A defined by the first saturation voltage V1, but electrons exceeding that are output to the supply line of the power supply voltage VAA of FIG. 2.

Next, as shown in FIG. 3(D), the saturation control voltage VSC is shifted to a voltage (second saturation voltage) V2 lower than the first saturation voltage V1 at the time T4.

At this time, the height of the potential barrier 11A of FIG. 4 is lowered to the level of the second saturation voltage V2, therefore the amount of charges which can be stored in the storage node SN increases by an amount corresponding to the rise of the saturation voltage (V1−V2). Accordingly, as shown in FIG. 3(E), the charge storage line 32 of the case where the incident light is strong begins to substantially linearly increase in the stored charge amount Ae from the time T4 and, after that, reaches the second saturation level L2 defined by the second saturation voltage V2 and is clipped at that level.

On the other hand, when the incident light is weak, the clipping (saturation) of the charge amount does not occur, but the charge storage still proceeds with the same ratio.

Next, as shown in FIG. 3(D), the saturation control voltage VSC is shifted to a voltage (third saturation voltage) V3 further lower than the second saturation voltage V2 at the time T5.

At this time, the height of the potential barrier 11A of FIG. 4 is lowered to the level of the third saturation voltage V3, therefore the amount of charges which can be stored in the storage node SN further increases by an amount corresponding to the rise of the saturation voltage (V2−V3). Accordingly, as shown in FIG. 3(E), the charge storage line 32 of the case where the incident light is strong begins to substantially linearly increase in the stored charge amount again from time T5 and after that reaches the third saturation level L3 defined by the third saturation voltage V3 and is clipped at that level.

On the other hand, in the charge storage line 33 of the case where the incident light is weak, the clipping (saturation) of the charge amount does not occur, but the charge storage still proceeds with the same ratio.

Charges stored in this way are output to the vertical signal line 14 via the amplifier transistor 13 of FIG. 2 and output as a potential fluctuation (image signal Vpix.) of the vertical signal line 14 from the pixel 21.

As shown in FIG. 3(C), at the point of time of end (time T6) of the V blanking period 30, the transfer voltage VT is shifted from the high level to the low level, whereby the transfer transistor 12 is turned off.

After that, the imaging signal is fetched into the register etc. for each row from the vertical signal line 14 of FIG. 2 by a not shown horizontal drive circuit 22, serial-to-parallel converted there, and output as a time series image signal Vpix. to the outside of the imaging element 10.

Note that FIG. 3(E) shows a case where the stored charge amount is clipped at three saturation levels, that is, three times in total, by the first saturation voltage V1, second saturation voltage V2, and third saturation voltage V3, and a case where this is not clipped even one time. There also exists a case where, in accordance with the incident light amount of the pixel, the stored charge amount is clipped at only the first saturation level L1 and a case where this is clipped at the first saturation level L1 and second saturation level L2.

Figure 5A:
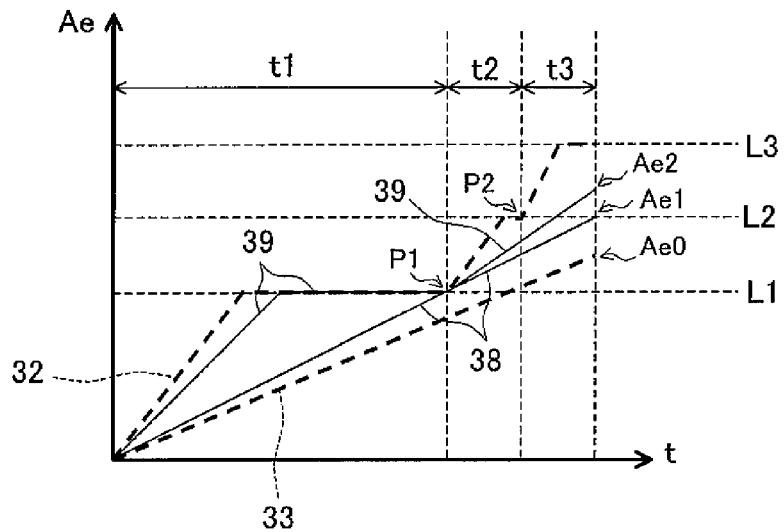
FIG. 5 (A) is an enlarged diagram of a trend along with time of a saturation level according to an embodiment of the present invention, and (B) is a graph of broken line control showing a relationship between an intensity of incident light and a signal level in an embodiment of the present invention.

FIG. 5(A) shows an enlarged view of FIG. 3(E) for explaining the saturation in a case where the incident light amount level is gradually raised. Further, the relationship between the intensity of the incident light and the level of the image signal Vpix. is shown in the graph of FIG. 5(B).

In FIG. 5(A), the charge storage line 32 of the case where the incident light is strong and the charge storage line 33 of the case where the incident light is weak are indicated by broken lines. Further, the application time of the first saturation voltage V1 (hereinafter referred to as a V1 application time) is indicated by a notation "t1", the application time of the second saturation voltage V2 (hereinafter referred to as a V2 application time) is indicated by a notation "t2", and the application time of the third saturation voltage V3 (hereinafter referred to as a V3 application time) is indicated by a notation "t3". Further, the change point of the charge storage line 32 at the time of the end of the application time t1 is indicated by a notation "P1", and the change point of the charge storage line 32 at the time of the end of the application time t2 is indicated by a notation "P2".

Figure 5B:
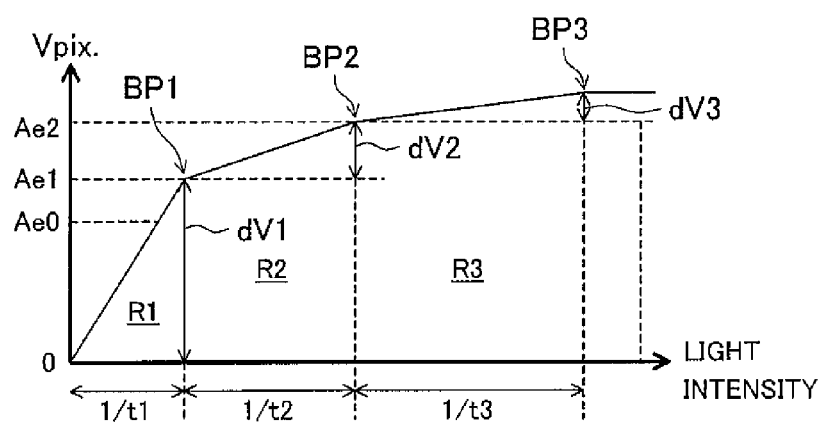

In FIG. 5(B), when the light intensity of the abscissa is gradually made large and the imaging operation is carried out for each change, the imaging operation is carried out without the influence of the first to third saturation voltages V1, V2, and V3 at first. In that case, as shown as the charge storage line 33 as an example in FIG. 5(A), electrons almost linearly increase during the storage time. The charge storage amount at the time of the end of the storage time becomes Ae0. When the incident light amount is further raised from the time of the imaging operation of this charge storage line 33, the electrons substantially linearly increase up to the limit where saturation according to the first saturation level L1 occurs as in the charge storage line 38 shown in FIG. 5(A). This charge storage line 38 contacts the change point P1 in that state. The charge storage amount at that time is Ae1.

When the incident light amount is further raised, the time during which the output is suppressed by the first saturation voltage V1 in the application time t1 gradually become longer, therefore the rate of increase of the charge storage amount at the time of the end of the storage time is lowered by that amount. As a result of that, as shown in FIG. 5(B), the inclination of the image signal Vpix. level with respect to the light intensity becomes smaller at a break point BP1 as a border. The break point BP1 is determined according to the application time t1 and a parameter (hereinafter referred to as a sensitivity coefficient) dV1. The sensitivity coefficient dV1 is the parameter determined by a voltage difference between the first saturation voltage V1 and reset voltage VRT (VRT−V1) and a charge storage capacity (capability) of the pixel etc. When this sensitivity coefficient is large, rapid charge storage is possible, while conversely when this is small, charges are hard to store.

When the incident light amount is further raised, as shown by the charge storage line 39 shown in FIG. 5(A), a state of contact with the change point P2 at the time of the end of the application time t2 is exhibited. The charge storage amount at that time is Ae2. When the incident light amount is further raised from that at the time of the imaging operation of this charge storage line 39, in addition to the fact that the time of suppression of the output by the first saturation voltage V1 in the application time t1 gradually becomes longer, the time of suppression of the output by the second saturation voltage V2 gradually becomes longer in the application time t2 as well, therefore the rate of increase of the charge storage amount is further lowered by that amount. As a result of that, as shown in FIG. 5(B), the inclination of the image signal Vpix. level with respect to the light intensity becomes further smaller at the break point BP2 as the border. The break point BP2 is determined according to the application time t2 and sensitivity coefficient dV2 in the same way as the break point BP1. The sensitivity coefficient dV2 is a parameter determined by the voltage difference (V1−V2) between the first saturation voltage V1 and second saturation voltage V2 and the charge storage capacity (capability) of the pixel etc. When this sensitivity coefficient is large, rapid charge storage is possible, while conversely when this sensitivity coefficient is small, charges are hard to store.

After that, the break point BP3 is reached in the same way, and the output (level of the image signal Vpix.) becomes constant after that. Note that the break point BP3 is close to the maximum light intensity, so this break point may be regarded as the maximum luminance as well. Below, the break point BP3 will not be considered.

The image signal Vpix. having such a light versus intensity characteristic in one picture is converted at the A/D conversion portion 2 of FIG. 2 to for example a signal of 0 to 255 gradations in a case of 8 bits or a digital signal of 0 to 1023 gradations in a case of 10 bits and output to the image signal processing portion 3. The processing for the dynamic range expansion is executed there.

Next, the configuration for the dynamic range expansion processing, that is, the function of the image signal processing portion 3, will be explained Note that whether or not this dynamic range expansion processing is to be executed can be set by the user at the camera device of FIG. 1. A not shown operation portion or remote operation may be used to set the high dynamic range mode on or off.

Figure 6:
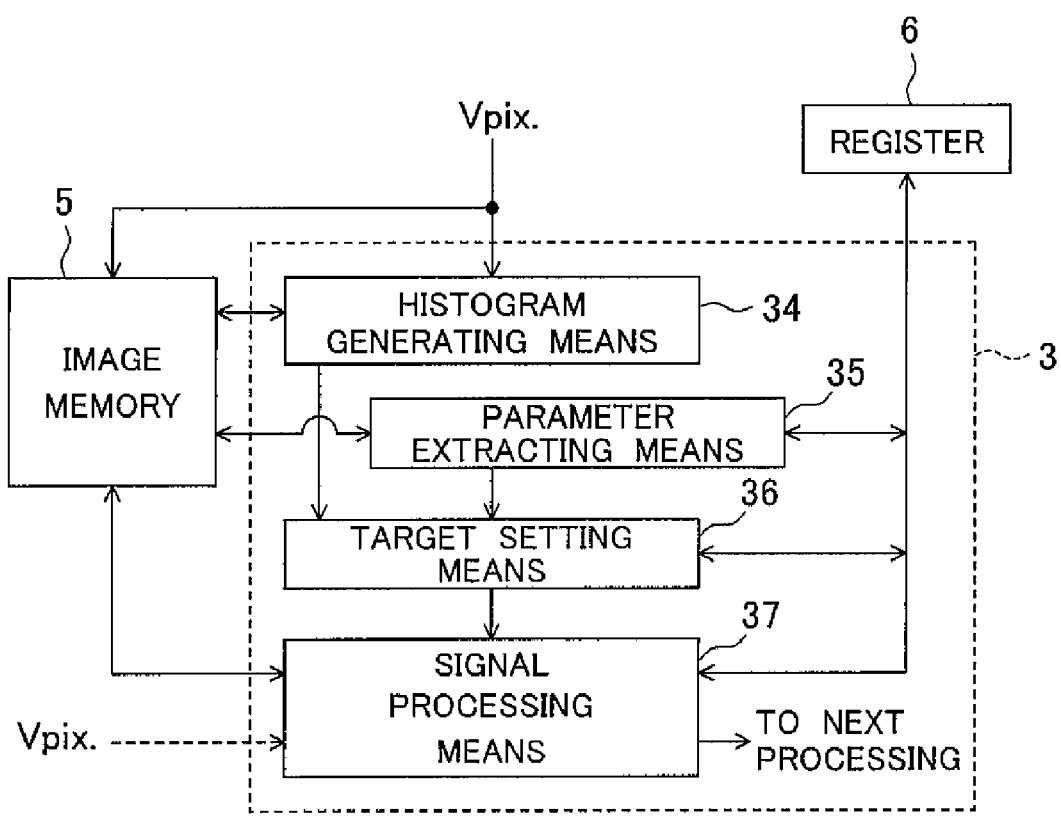
FIG. 6 A functional block diagram of an image signal processing portion according to an embodiment of the present invention.

FIG. 6 shows functional block diagram of the image signal processing portion 3 relating to the dynamic range enlargement processing.

The image signal processing portion 3 includes four means which can be realized as functions of a program for operating the DSP. Concretely, the image signal processing portion 3 includes a histogram generating means 34, parameter extracting means 35, target setting means 36, and signal processing means 37. Note that, in the method using the reset level performed in the present embodiment, the processing for the dynamic range expansion is not executed by this signal processing means 37. This signal processing means is provided in order to perform the other processing explained before. Accordingly, the signal processing means 37 is not an indispensable configuration. On the other hand, in the case of multiple exposure as will be explained later, the processing for the dynamic range expansion by image mixing is executed by this signal processing means 37.

Part of the functions of the above four means can be realized by hardware by logical circuits or the like in the ASIC. The processing content executed by above means will be clarified in the next explanation of the processing sequence.

Figure 7:
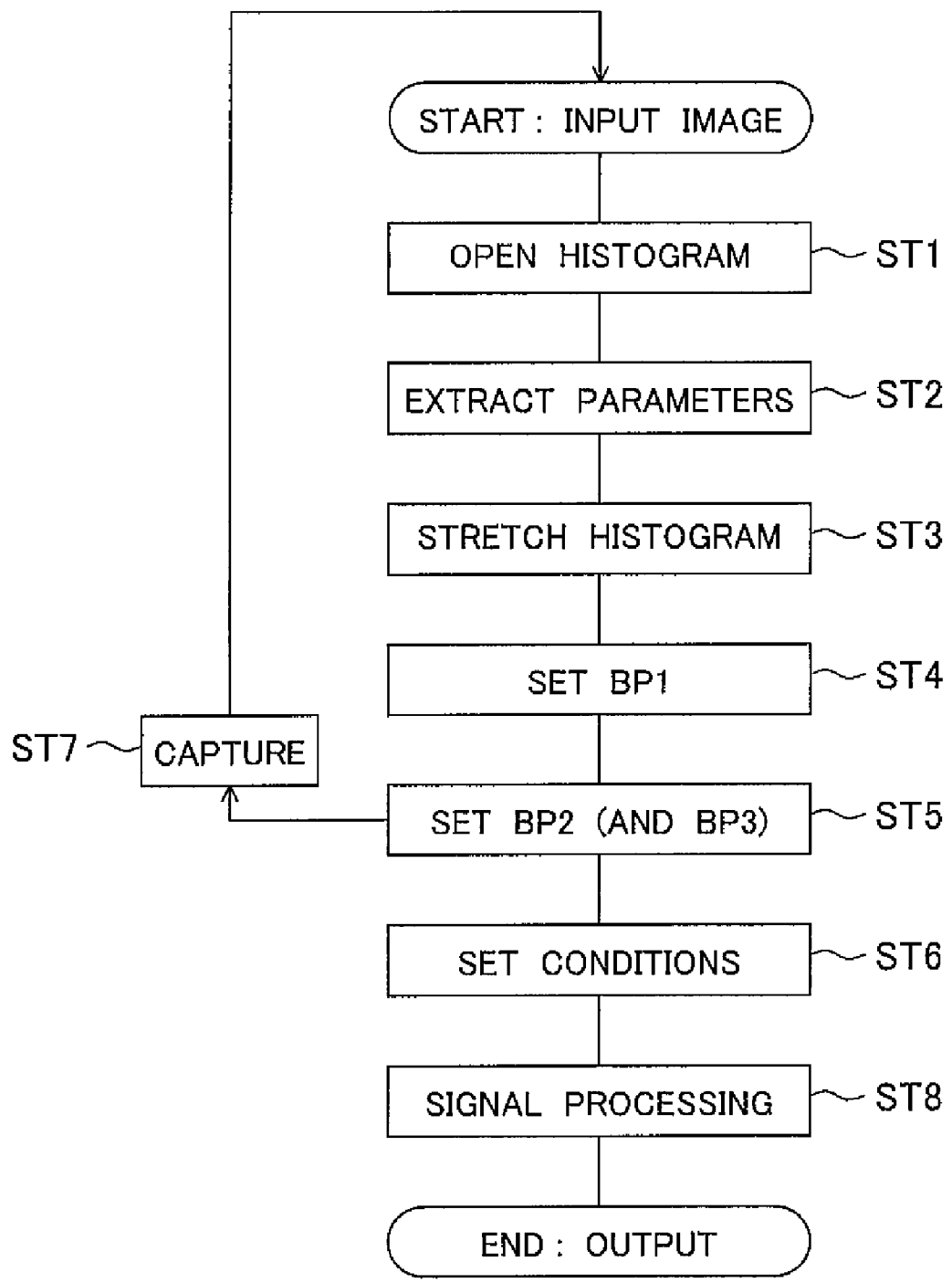
FIG. 7 A flow chart of dynamic range enlargement processing according to an embodiment of the present invention.

FIG. 7 is a flow chart of the dynamic range expansion processing in the present embodiment. Here, assume that the image signal Vpix. has 0 to 255 luminance levels.

When the image signal Vpix. is input into the image signal processing portion 3, first, by the control of the histogram generating means 34, the image signal Vpix. of one field picture or one frame picture is stored in the image memory 5 of FIG. 1 (step ST1).

At this time, the histogram generating means 34 opens pixel unit data on the image memory 5 of FIG. 1 as a histogram indicating the relationship between the pixel signal level (gradation level or luminance level) and the number of the same (number of pixels). As a concrete method of opening a histogram, for example the histogram generating means 34 once stores the image signal Vpix. before opening the histogram in the image memory 5, reads it out, calculates the histogram, and then stores the obtained histogram data in another region of the image memory 5. In this histogram calculation, it counts how many picture's worth of pixel data there are for each of the 0 to 255 luminance levels and generates histogram data indicating a correspondence between that count and the luminance level value.

Figure 8:
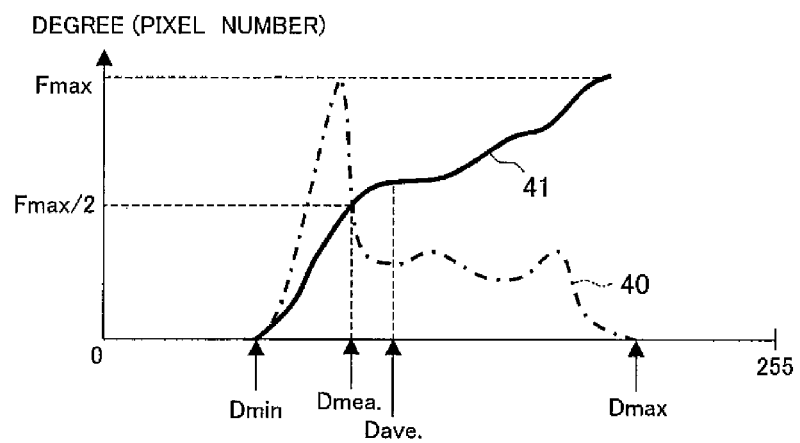
FIG. 8 A graph illustrating a histogram according to an embodiment of the present invention.

FIG. 8 shows an example of the histogram. The abscissa of FIG. 8 represents the luminance level values 0 to 255, while the ordinate represents a degree (pixel number) of the luminance level value in one picture.

A curve of a one-dot broken line given the notation 40 in FIG. 8 shows an example of the distribution of the histogram data. In this way, the histogram data 40 in one picture does not always include all of the luminance level values 0 to 255 defined by the processing bit width of the image signal processing portion 3 of FIG. 1 and the dynamic range of the A/D conversion portion 2. There are many cases where the minimum value Dmin of the histogram data 40 is larger than the luminance level value 0, and the maximum value Dmax is smaller than the luminance level value 255. Naturally, there also exists a case where the luminance level value 0 matches with the minimum value Dmin of the histogram data 40, and a case where conversely the maximum value Dmax of the histogram data 40 matches with the luminance level value 255. There are a variety of shapes of distribution and positions in the luminance level values 0 to 255 according to the image to be captured.

Further, a curve of a solid line given the notation 41 in FIG. 8 indicates a case where the cumulative value of the degree (pixel number) is plotted on the ordinate of the graph.

Here, the luminance level value corresponding to the center point (mean point) of exactly half of the maximum value Fmax of the curve 41 representing the cumulative value of the pixel number indicates a representative value of the luminance in one picture and will be defined as a mean value Dmea. below. Further, the average value of luminance of the histogram data 40 represents a center of the luminance in one picture and will be defined as an average value Dave. below.

Here, the explanation will be returned back to the flow chart of FIG. 7.

At step ST2, the parameter extracting means 35 of FIG. 6 searches through the image memory 5 and extracts the luminance parameters of FIG. 8 described above, that is, the minimum value Dmin and maximum value Dmax of the histogram data. Further, as the luminance parameter determining the first control target as will be explained later, the mean value Dmea. or average value Dave. is extracted by the parameter extracting means 35 by searching through the image memory 5. Below, a case where the average value Dave. is used will be taken as an example.

The parameter extracting means 35 stores the extracted parameters of the minimum value Dmin, maximum value Dmax, and average value Dave. in the register 6 of FIG. 6 so that discrimination is possible.

At the next step ST3, as desirable processing, the histogram generating means 34 of FIG. 6 reads out the histogram data 40 (FIG. 8) in the image memory 5 and enlarges the distribution as a whole so that the minimum value Dmin thereof becomes the luminance 0 and the maximum value Dmax becomes the luminance 255. This processing is referred to as a histogram stretch. While not an indispensable processing, it is desirably performed in the sense of raising the subsequent processing precision (processing resolution). In the distribution after the histogram stretch, naturally the average value Dave. (or mean value Dmea.) is changed as well.

Note that when performing the histogram stretch, the work of storing the minimum value Dmin, maximum value Dmax, and average value Dave. or other parameter in the register 6 must be carried out not at step ST2, but after the histogram stretch.

At the next step ST4, the target setting means 36 of FIG. 6 reads out the above various types of parameters from the register 6 and sets the first target value based on these parameters. In the setting of this first target value, the control is performed so that the break point BP1 explained in FIG. 5(B) and the average value Dave. in the histogram data 40 of FIG. 8 substantially match. As a concrete control value, use can be made of a shutter speed of the imaging element 10 and/or gain value of the gain amplifier usually provided in the output stage in the imaging element 10 or in the image signal processing portion 3. In order to control the shutter speed of the imaging element 10, an OFD level in the imaging element 10 may be controlled as well. The charge storage time may be increased or decreased by shifting the time T2 when the imaging of FIG. 3 is started in the period 31. When any of these shutter speed and gain value of the gain amplifier is controlled, the brightness of the picture changes and the average value Dave. shifts as well along with that. At this time, the brightness control of the picture is carried out so that the average value Dave. approaches the break point BP1.

Note that it is not always necessary to make the average value Dave. perfectly match the break point BP1. The control may be ended by regarding them as matching when entering in a certain permissible range.

Further, when performing brightness control of the picture, the control is delayed by the amount of one picture. When desiring to avoid this control, calculation may be performed using the position of the average value Dave. within a range defined by the minimum value Dmin and the maximum value Dmax, the application time t1 defining the break point BP1, the sensitivity parameter, etc. to predict the orientation and amount of the control of the brightness in advance for feed forward control.

At the next step ST5, the target setting means 36 of FIG. 6 sets the second target value corresponding to the next break point BP2 (FIG. 5(B)) by utilizing the relationship between the already set first target value and the minimum value Dmin and maximum value Dmax read out from the register 6.

In more detail, a ratio of a value obtained by subtracting the minimum value Dmin from the first target value (BP1) with respect to the value obtained by subtracting the minimum value Dmin from the maximum value Dmax is found. Then, when this ratio is small, it is judged that there are relatively many dark portions in the picture, so the second target value (=BP2) is set at a position not relatively far from the first target value in light intensity. Conversely, when the above ratio is large, it is judged that there are relatively many bright portions in the picture, so the second target value (=BP2) is set further from the first target value in light intensity.

At this time, the output difference of the second target value (=BP2) from the first target value (distance of ordinate of FIG. 5(B)) may also be set in accordance with the above ratio. That is, desirably the output difference is made large when the above ratio is small, while the output difference is made small when the above ratio is large.

FIG. 9 and FIG. 10 show the rough difference of how the break point BP2 is set between the case where the amount of bright portions is small in the picture and the case where the amount of bright portions is large. The histogram distribution is shown in (A) of each diagram, and the graph of the broken line control the same as that in FIG. 5(B) is shown in (B) of each diagram.

Figure 9A:
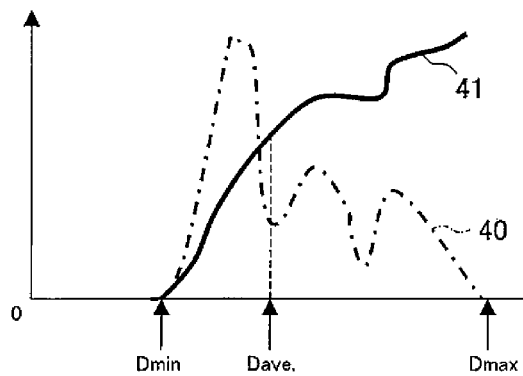
FIG. 9 (A) is a histogram in a case where there are few bright portions on a picture in an embodiment of the present invention, and (B) is a broken line control graph.
Figure 9B:
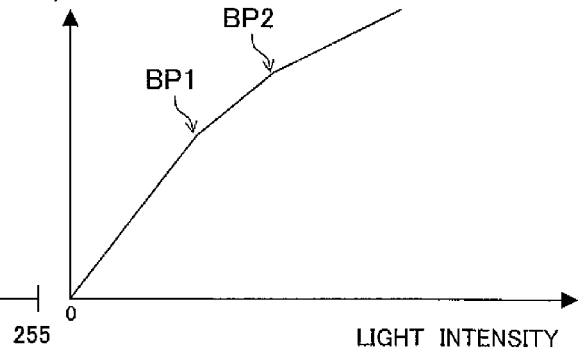

In the case of FIG. 9(A) where the amount of the bright portions is small, in the broken line control shown in FIG. 9(B), the break point BP2 is set at a relatively close position to the break point BP1 in the light intensity. On the other hand, in the case of FIG. 10(A) where the amount of the bright portions is large, in the broken line control shown in FIG. 10(B), the break point BP2 is set at a relatively far position from the break point BP1 in the light intensity.

The output difference of the break point (level difference of the image signal Vpix.) is smaller in the case of FIG. 10(B) in comparison with the case of FIG. 9 (B)

When the saturation characteristic (broken line control characteristic) of each pixel is controlled in accordance with the magnitude of the bright portions of the picture in this way, a signal advantageous for the dynamic range expansion is obtained.

The relationships between the above ratio used for the setting of this break point BP2 and the setting parameters of the second target value (ordinate of FIG. 5(B), distances from the first target value of the abscissa) which were found empirically may be held in advance in a table etc. In the case of the present embodiment for vehicle mounting, these relationships are found in advance under conditions enabling the brightness of the picture to be set so that the white line of the road can be detected even when the vehicle exits from a dark tunnel to the outside of the tunnel in the bright midday and conversely when the vehicle enters into a dark tunnel from the bright midday and further under all road conditions.

Here, when preparing the data to be held in the table, it should be checked whether the white line of the road can be detected in accordance with the brightness of the picture by for example an edge detection method.

FIG. 11 and FIG. 12 show concrete examples of the edge detection.

A waveform of a detection signal St of the edge of the white line when capturing an image of a road (object to be captured) as shown in FIG. 11(C) is shown in FIG. 11(A). This detection signal St is influenced by a noise level shown in FIG. 12(A) and the saturation level shown in FIG. 12(B). In particular, when the object is dark, the noise level is large, while when the object is bright, the edge is blurred due to saturation.

Figure 12A:
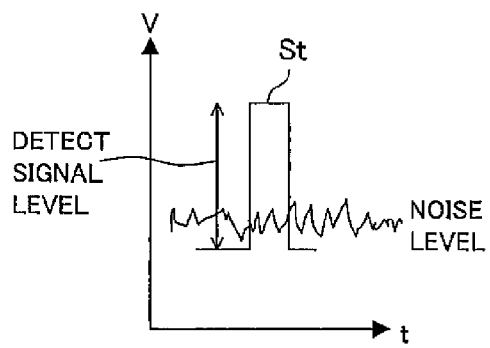
FIGS. 12 (A) and (B) are graphs showing relationships between a detection signal St and noise and a saturation level.
Figure 12B:
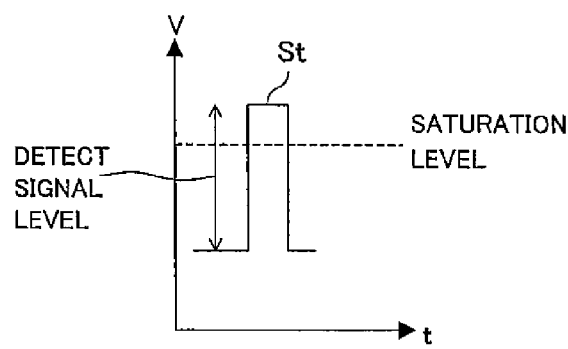

For this reason, when trying to confirm an edge position of the white line by an edge threshold value VH of a high level and an edge threshold value VL of a low level for a signal which is edge enhanced by differentiating the detection signal St shown in FIG. 11(A), as shown in FIG. 12(B), if the detection signal St exceeds the saturation level, the edge is blurred and the detection precision of the high level of the edge enhanced signal is lowered. Further, if the level of the noise superimposed on the detection signal St is large as shown in FIG. 12(A), the edge is buried in the noise and the detection precision of the low level of the edge enhanced signal is lowered.

In this way, in both of the case where the picture is bright and the case where the picture is dark, it becomes hard to detect the white line.

For this reason, it is checked whether or not the edge of the white line can be detected in the relationship between the above ratio used for the setting of the break point BP2 explained before and the setting parameter of the second target value with the integral value of all image signals Vpix. or the ratio occupied in the picture of the bright regions (or dark regions) of the histogram or other data representing the brightness of the picture. Further, the relationship between the above ratio or setting parameter of the second target value and the data representing the brightness of the picture is stored in a table conditional on detection of the edge of the white line being possible in a case where the imaging environment changes from the assumed brightest state to the assumed darkest state and in a converse case.

From the above, it is possible to set a suitable second target value by referring to this table.

Here, the explanation will be returned back to the flow chart of FIG. 7 again.

At step ST5, for example, the target setting means 36 of FIG. 6 finds, if necessary, a break point BP3 as well and then determines first to third saturation voltages V1., V2, and V3 and application times t1, t2, and t3 etc. of the imaging element shown in FIG. 3 in accordance with the first and second target values (and third target value).

After that, the next picture is captured under this condition (step ST7). The image signal Vpix. obtained by this imaging element becomes one changed in the output saturation characteristic of the image signal from that at the time of the previous imaging operation as a result of which the dynamic range is expanded.

The image signal Vpix. is input to the histogram generating means 34 and/or image memory 5, whereupon the above processing from steps ST1 to ST7 is executed in order to find the condition at the time of the next imaging operation.

On the other hand, at step ST8, the signal processing means 37 executes predetermined processing with respect to the input image signal Vpix. and outputs the result.

In this way, in the present image signal processing method, the next imaging condition is adaptively determined based on the input image signal Vpix. whereby the dynamic range is optimized (enlarged).

Figure 13A:
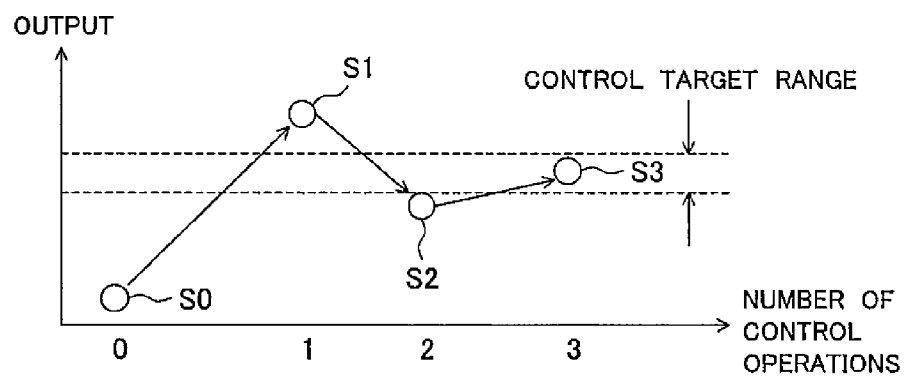
FIG. 13 (A) is a diagram schematically showing conventional control, and (B) is a diagram schematically showing control to which the present invention is applied.
Figure 13B:
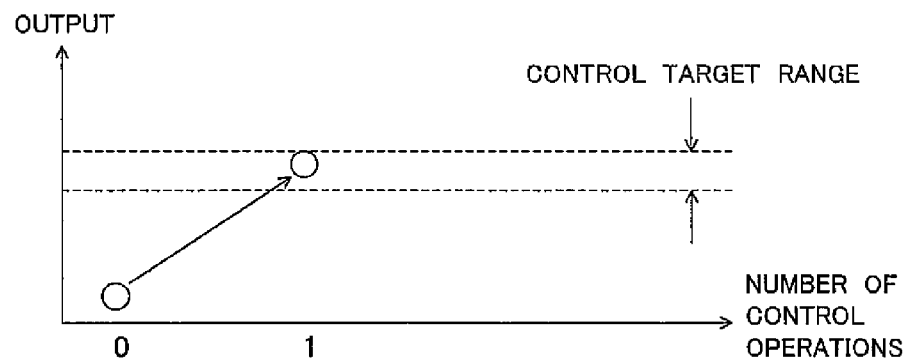
Figure 14A:
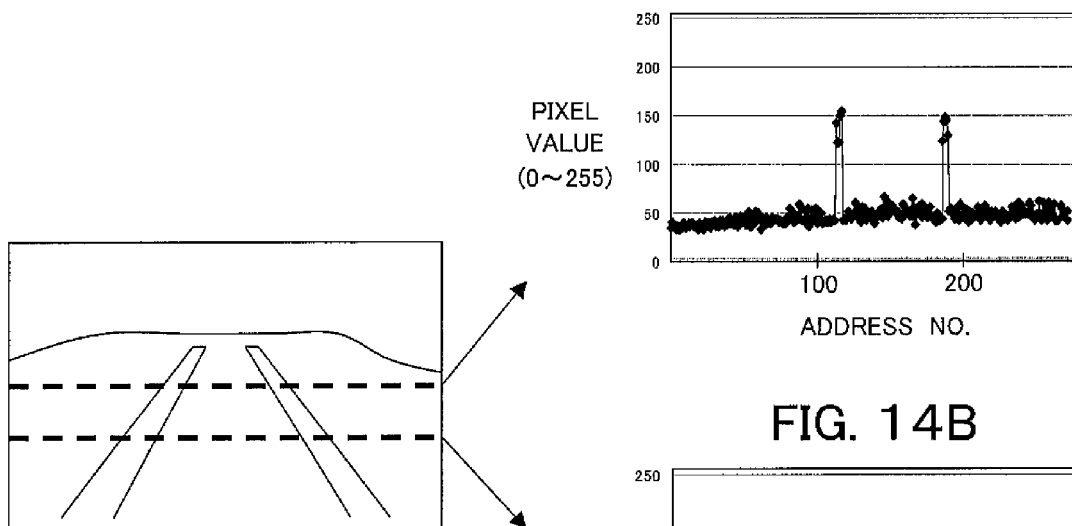
FIGS. 14 (A) to (C) are diagrams showing detection levels of an edge of a white line during night and during the day.
Figure 14B:
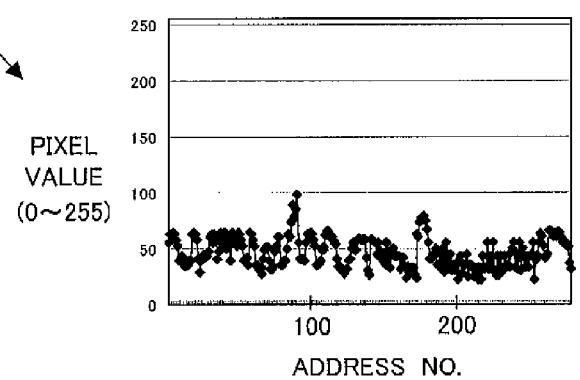
Figure 14C:
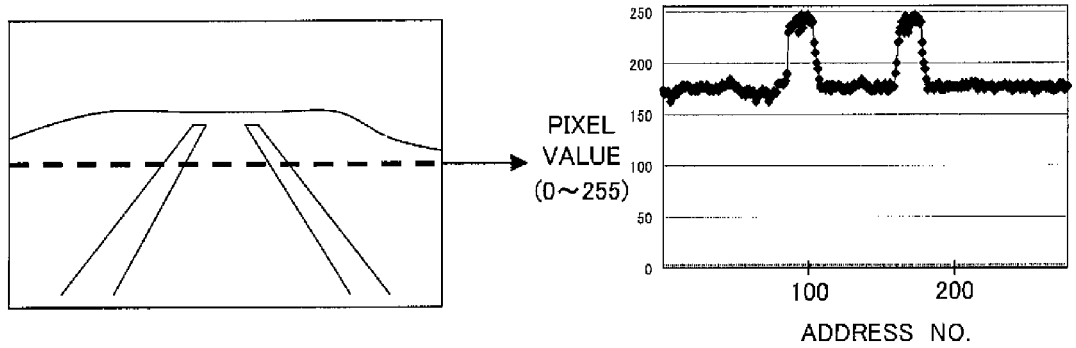

FIG. 13(B) shows the effects of the present embodiment in comparison with FIG. 13(A). Further, FIG. 14(A) to FIG. 14(C) show detection levels of the edge of the white line during the night and during the day.

As explained above, in the present image signal processing method, the next imaging condition is decided from the obtained image signal Vpix. by a single control operation, and the next imaging operation is carried out under that condition. For this reason, the result enters into the control target range not by feedback control as shown in FIG. 13(A), but by one control operation. Note that finely adjusting the parameters so that the control target range is entered more reliably is not excluded from the present invention.

In particular, in the present embodiment, the first target value (break point BP1) is controlled to the average value Dave. (or mean value Dmea.). Therefore, burying of the edge of the white line in the noise level in a dark image during the night as shown in FIG. 14(A) and reaching of the saturation level by the edge of the white line in a bright image during the day as shown in FIG. 14(C) are effectively prevented. An image in which the edge detection at a suitable level is possible such as for example as shown in FIG. 14(B) is obtained.

Finally, a method of using multiple exposure will be explained, although just simply.

The difference of the multiple exposure from the timing chart of FIG. 3 resides in that the capturing (exposure) operation is repeated several times in the period 31. At this time, the stored charge amount is reset for each imaging operation. If the imaging time differs for each imaging operation, a plurality of image signals for the same object to be captured, including at least an image signal shortened in the imaging time so as not to cause saturation and an image signal prolonged in the imaging time considering the case where the signal level is low, are sequentially output from the imaging element 10.

When comparing the case where the imaging time is made short and the case where the imaging time is made long by the same time scale, the inclination of the change of the signal charge is relatively larger in the former by the amount of resistance to saturation. The same inclination in the latter short imaging time case becomes relatively smaller. When applying this fact to FIG. 5(B), it is easily understood that broken line control having a break point is possible in multiple exposure changed in the imaging time.

The present method extracts an image of a region R1 having the break point BP1 as a vertex in FIG. 5(B), an image of a region R2 having the break point BP2 as a vertex, and an image of a region R3 having the break point BP3 as a vertex from the image signals Vpix. of the multiple exposures and mixes the images to obtain a single picture. For this purpose, in the same way as the method explained before, extraction of the minimum value Dmin, maximum value Dmax, average value Dave, (or mean value Dmea.), and other parameters and setting of a target value are necessary. When the present invention is applied to these processing, processing with better response can be executed.

For the configuration of FIG. 6 itself, the same configuration can be utilized. However, the signal processing means 37 in this method has a function of sequentially inputting a plurality of image signals Vpix. obtained when capturing the same object to be captured, performing the image mixing, and outputting the same.

Note that, in the image mixing, for example, processing of extending or compressing the image by for example pixel data interpolation and thinning is necessary, therefore the image memory 5 is utilized.

As described above, in the method using multiple exposure as well, the technique of the present invention for setting the target value (break point) can be applied.

According to the present embodiment, distribution parameters are extracted from the distribution of pixel signal levels of one picture, the target value of the break point is determined based on those, the imaging portion is controlled so that the determined target value is obtained, and the output saturation characteristic thereof is changed or a plurality of pictures are mixed. Therefore, in most cases, the generation of a high quality captured image adapted to the imaging environment and having a wide dynamic range becomes possible by one control operation. That is, dynamic range expansion processing with a high response can be executed.

In particular, the average value or mean value of the distribution is used for the first target value. Therefore, even when the imaging environment differs, an image capturing an object to be captured at the proper level can be obtained without being buried in the imaging noise level and without blurring of the edge of the object due to saturation.

The invention claimed is:

1. An image signal processing method for expanding a dynamic range of an image signal obtained from an imaging portion,
   said image signal processing method characterized by comprising
   a first step of extracting distribution parameters from a distribution of pixel signal levels composing the image signal of one picture,
   a second step of determining a target value of a break point at which an inclination of the change of image signal level with respect to a cumulative change of amount of light incident upon the pixels of the imaging portion changes on the basis of the extracted distribution parameters, and
   a third step of making an output saturation characteristic of the image signal change, by controlling the imaging portion so that the target value is obtained,
   wherein the distribution parameters include a minimum value of the pixel signal levels in the one picture,
   the target value includes a first target value indicating a maximum level of a first region having the minimum value as a starting point on the distribution,
   in the first step, an average value of the pixel signal levels of the distribution is extracted,
   in the second step, the first target value within a predetermined range about the average value is set,
   the distribution parameters include a maximum value of the pixel signal levels in the one picture, and
   in the second step, a ratio of a value obtained by subtracting the minimum value from the first target value with respect to a value obtained by subtracting the minimum value from the maximum value is found and the ratio is used to determine a second target value.

2. An image signal processing method as set forth in claim 1, further having a histogram stretch step of extending the entire distribution so as to make the minimum value match with the bit having the smallest bit width determined in advance in order to execute the processing and to make the maximum value match with the largest bit.

3. An image signal processing method as set forth in claim 2, further having a step of determining whether or not to perform the second step and the subsequent step(s) based on the distribution parameters.

4. An image signal processing device for expanding a dynamic range of an image signal obtained from an imaging portion,
   said image signal processing device comprising:
   a parameter extraction portion for extracting distribution parameters from a distribution of pixel signal levels composing an image signal of one picture;
   a target setting portion for determining a target value of a break point at which an inclination of the charge of image signal level with respect to a cumulative change of amount of light incident upon the pixels of the imaging portion changes on the basis of the extracted distribution parameters, and
   a control part for of making an output saturation characteristic of the image signal change, by controlling the imaging portion so that the target value is obtained,
   wherein the distribution parameters include a minimum value of the pixel signal levels in the one picture,
   the target value includes a first target value indicating a maximum level of a first region having the minimum value as the starting point on the distribution,
   the parameter extraction portion extracts an average value of pixel signal levels of the distribution,
   the target setting portion sets the first target value within a predetermined range about the average value,
   the distribution parameters include a maximum value of pixel signal levels in the one picture, and
   the target setting portion finds a ratio of a value obtained by subtracting the minimum value from the first target value with respect to a value obtained by subtracting the minimum value from the maximum value and uses the ratio to determine the second target value.

5. An image signal processing device as set forth in claim 4, further comprising a histogram generation portion for generating a histogram representing the distribution and performing a histogram stretch extending the entire distribution so as to make the minimum value match with the bit having the smallest bit width determined in advance in order to execute the processing and make the maximum value match with the largest bit.

6. An image signal processing device for expanding a dynamic range of an image signal obtained from an imaging portion, comprising:
   a parameter extraction portion for extracting distribution parameters from a distribution of pixel signal levels composing an image signal of one picture;
   a target setting portion for determining a target value of a break point at which an inclination of the charge of image signal level with respect to a cumulative change of amount of light incident upon the pixels of the imaging portion changes on the basis of the extracted distribution parameters, and
   a control part for of making an output saturation characteristic of the image signal change, by controlling the imaging portion so that the target value is obtained,
   wherein the distribution parameters include a minimum value of the pixel signal levels in the one picture,
   the target value includes a first target value indicating a maximum level of a first region having the minimum value as the starting point on the distribution,
   the parameter extraction portion extracts an average value of pixel signal levels of the distribution, the target setting portion sets the first target value within a predetermined range about the average value, the distribution parameters include a maximum value of pixel signal levels in the one picture, and the target setting portion finds a ratio of a value obtained by subtracting the minimum value from the first target value with respect to a value obtained by subtracting the minimum value from the maximum value and uses the ratio to determine the second target value.

7. An image signal processing device as set forth in claim 6, further comprising a histogram generating means for generating a histogram representing the distribution and performing a histogram stretch extending the entire distribution so as to make the minimum value match with the bit having the smallest bit width determined in advance in order to execute the processing and make the maximum value match with the largest bit.

* * * * *